United States Patent
Coast et al.

(12) 
(10) Patent No.: US 6,305,882 B1
(45) Date of Patent: Oct. 23, 2001

(54) APPARATUS FOR PLACING AUGER TYPE ANCHORS

(75) Inventors: John B. Coast; Waino J. Kangas, both of Baton Rouge, LA (US)

(73) Assignee: Coast Machinery, Inc., Baton Rouge, LA (US)

( * ) Notice: Subject to any disclaimer, the term of this patent is extended or adjusted under 35 U.S.C. 154(b) by 0 days.

(21) Appl. No.: 09/151,012

(22) Filed: Sep. 10, 1998

Related U.S. Application Data (63) Continuation of application No. 08/820,121, filed on Mar. 19, 1997, now Pat. No. 5,811,741.

(51) Int. Cl.⁷ .................................................. E02D 7/22
(52) U.S. Cl. ......................... 405/232; 175/171; 173/28
(58) Field of Search ................................ 405/231, 232, 405/199, 233, 229, 258, 259.1, 244; 175/171, 162; 173/28, 46, 48, 49, 52, 27, 147

(56) References Cited

U.S. PATENT DOCUMENTS

| | | | |
|---|---|---|---|
| 701,547 | * | 6/1902 | Davis .................................... 175/171 |
| 3,148,739 | * | 9/1964 | Mattingly et al. ............... 405/232 X |
| 3,356,163 | * | 12/1967 | Rowe et al. ..................... 405/232 X |
| 3,777,827 | | 12/1973 | Thiery et al. ......................... 175/103 |
| 3,869,003 | * | 3/1975 | Yamada et al. ...................... 175/171 |
| 3,872,932 | | 3/1975 | Gosselin .................................... 173/1 |
| 4,164,082 | * | 8/1979 | Watson .......................... 405/259.1 X |
| 4,492,274 | | 1/1985 | Schosek ................................. 175/19 |
| 4,499,698 | * | 2/1985 | Hoyt et al. ....................... 405/258 X |
| 4,603,748 | | 8/1986 | Rossfelder et al. ..................... 175/19 |
| 4,718,048 | | 1/1988 | Staron et al. ........................... 367/40 |
| 4,819,740 | | 4/1989 | Warrington ............................ 173/49 |
| 5,040,926 | | 8/1991 | Andreasson ........................... 405/232 |
| 5,174,388 | * | 12/1992 | Williams et al. ................ 405/232 X |
| 5,213,449 | * | 5/1993 | Morris .................................. 405/232 |
| 5,355,964 | | 10/1994 | White ....................................... 173/1 |
| 5,549,168 | * | 8/1996 | Sadler et al. ..................... 405/232 X |
| 5,584,603 | * | 12/1996 | Cortlever ......................... 405/232 X |
| 5,733,068 | * | 3/1998 | Reinert ................................. 405/232 |
| 5,791,820 | * | 8/1998 | Rempel ........................... 405/231 X |

FOREIGN PATENT DOCUMENTS

405059725 A  * 3/1993 (JP) ..................................... 405/232

* cited by examiner

*Primary Examiner*—David Bagnell
*Assistant Examiner*—Frederick L. Lagman
(74) *Attorney, Agent, or Firm*—Garvey, Smith, Nehrbass & Doody, LLC (57) ABSTRACT

An apparatus for placing auger type anchors into the earth includes a machine frame that supports an elongated housing. The housing has upper and lower end portions. An anchor holder is positioned at the lower end of a tubular member rotatably mounted in the housing for holding an anchor and rotating it during placement. A plurality of drive wheels carried by the frame transport the housing between upper and lower positions. The wheels are loaded with adjustable compression springs so that extensive pressure can be applied from the drive wheels to the housing for gripping and driving the housing during insertion. A gear train interconnects the driving wheels so that all of the driving wheels rotate at the same rotational speed.

29 Claims, 7 Drawing Sheets

APPARATUS FOR PLACING AUGER TYPE ANCHORS

CROSS-REFERENCE TO RELATED APPLICATIONS

This is a continuation of U.S. patent application Ser. No. 08/820,121, filed Mar. 19, 1997, now U.S. Pat. No. 5,811,741 which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the placement of auger type anchors into the earth and more particularly to an improved powered drive apparatus that partially or fully buries an auger type anchor into the earth. More particularly, the present invention relates to a method and apparatus for placing auger type anchors partially or fully below the earth's surface using a drive that both rotates and simultaneously is capable of pushing axially on, and guiding the anchor during installation. The drive uses a series of gear driven drive rollers that are each shaped to grip the outer surface of a square tubing with a rotary shaft inside the tubing and wherein a frame supports the gears and the drive rollers.

2. General Background of the Invention

Presently, a high torque drive mounted on a digger-derrick truck has been used to install auger type anchors in the utility industry. Auger type anchors are manually installed in remote areas (wetlands, swamps) using a handle or lever to rotate the anchor, since it is not possible to put very heavy equipment in such areas. This process is time consuming, labor intensive, and inefficient.

Some patents have issued that relate generally to a drilling apparatus, underground pipe or cable installation, vibratory earth boring systems, vibratory hammer/extractor devices, and methods of installing piling.

The Thiery et al. U.S. Pat. No. 3,777,827 discloses an apparatus for drilling a bore hole with a drill tool driven in rotation by a motor suspended from the end of a drill column constituted by a flexible drill pipe.

The Gosselin U.S. Pat. No. 3,872,932 discloses a process that comprises progressively increasing the weight on the drill bit, determining the greatest value of the penetration rate of the drill bit during this period, progressively decreasing the weight on the drill bit when the penetration rate has reached a determined value and again progressively increasing the weight on the drill bit when the tension on the drill pipe has reached a fixed value. The passage from a period during which this weight decreased and vice-versa is achieved by varying the linear speed of the drill pipe at the ground surface, whereby the tension on the drill pipe is varied.

The Schosek U.S. Pat. No. 4,492,274 relates to a light weight underground pipe or cable installing device adapted to be used in a narrow and deep operating trench. The Rossfelder et al. U.S. Pat. No. 4,603,748 discloses a vibrator system and a method for using a vibrator system to sink pipes or shape equipment. The prior art discussion contained in the '748 patent cites numerous patents and publications that relate in general to earth drilling, the sinking of piles, and pile driving.

The Staron et al. U.S. Pat. No. 4,718,048 discloses a method of locating on drill pipe and ground recordings elementary corresponding to one in the same depth level of the drilling tool, and grouping these elementary recordings in pairs, and then in intercorrelating said recordings of the pairs so as to produce in respect of each pair a correlated signal which is representative of the acoustic energy produced and of the difference in travel times of the waves received on sensors from which the pair of recordings have been obtained.

A vibratory hammer and extractor apparatus is disclosed in the Warrington U.S. Pat. No. 4,819,740.

The Andreasson U.S. Pat. No. 5,040,926 relates to a pile which is intended to take compressive as well as tensile loads or to serve as a reinforcement member in soils. A pile is driven from a roller shaping unit by means of pressure in arbitrary directions into a mass of an earth layer. Upon attainment of the desired depth of penetration and/or pile length the pile is severed at or close to the upper surface of the earth layer.

A pile driving and/or pulling vibratory assembly with counter weights is disclosed in U.S. Pat. No. 5,355,964 issued to John White.

BRIEF SUMMARY OF THE INVENTION

The present invention relates to an improved method and apparatus for placing auger type anchors partially or fully beneath the surface of the earth.

The present invention can be mounted on various vehicles, including those that are less intrusive of delicate habitat such as a marsh or swamp habitat. Thus, the present invention can be mounted on an air boat, lightweight marsh buggy, or truck.

The apparatus provides a machine frame and an elongated torque tube and drive tube move between upper and lower portions.

A drive having a plurality of powered drive wheels are carried by the frame for transporting a square tubing member, and an inner rotary pipe between upper and lower positions. The drive includes opposed wheels for frictionally gripping the outer surface of the square tubing member.

A gear train interconnects and drives some of the wheels so that all of the driven wheels rotate at the same rotational speed and direction.

A spring loaded pusher arrangement applies lateral pressure to the drive wheels for producing a frictional drive by generating a compressive force in between the drive wheels and the square tubing member.

In the preferred embodiment, there are two drive rollers and upper and lower sets of idler guide rollers.

In the preferred embodiment, the drive rollers have annular grooves that correspond in shape to and conform generally to the outer surface of the square tubing housing which is preferably smooth having uninterrupted outer surfaces along its length.

A motor drive has a shaft that carries one drive gear that is engaged with an upper and a lower gear. The upper and lower gears carry driven rollers that engage the square tubing housing.

BRIEF DESCRIPTION OF THE SEVERAL VIEW OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE INVENTION

Figure 1:
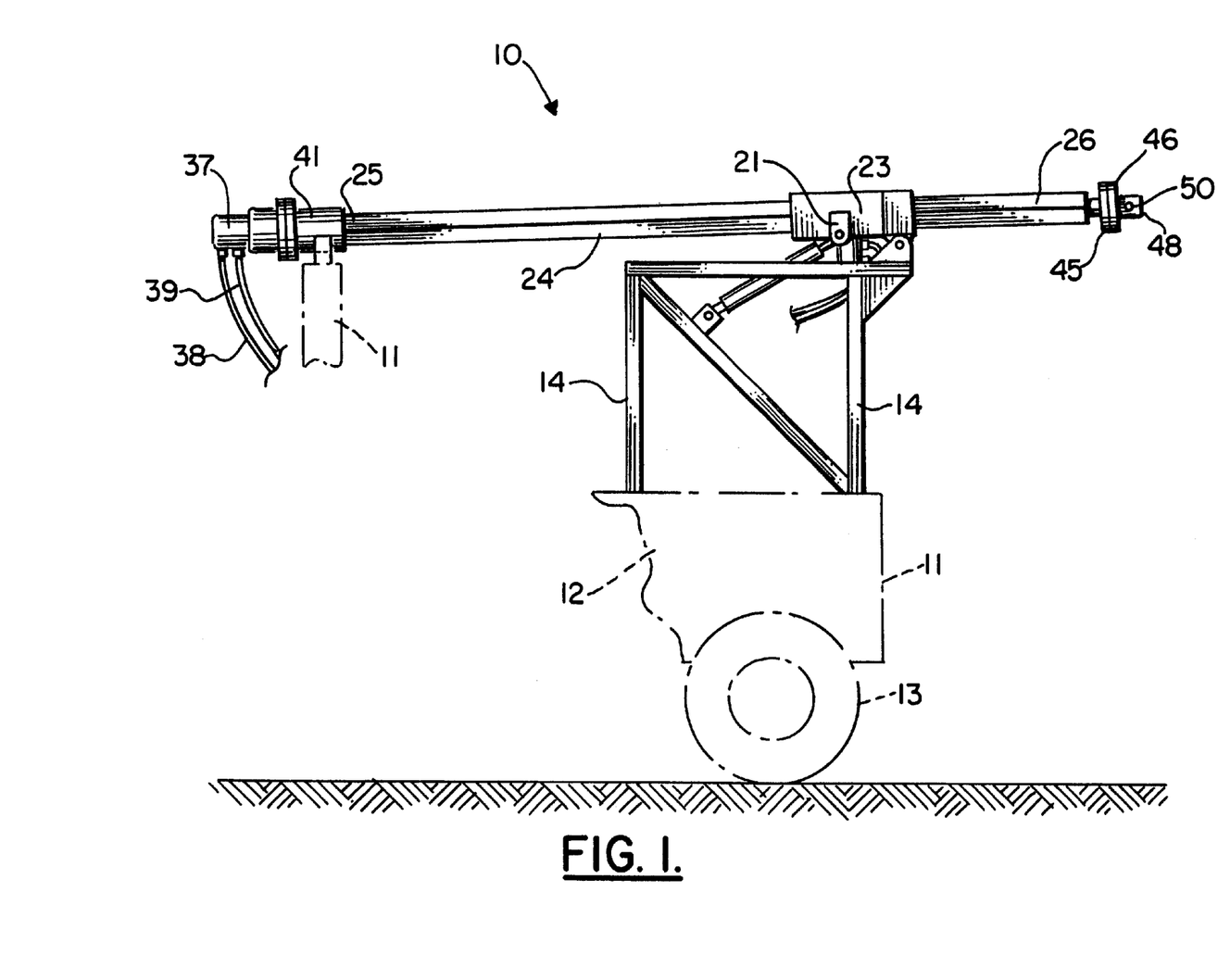
FIG. 1 is an elevational view of the preferred embodiment of the apparatus of the present invention shown in a stored position on a support vehicle.
Figures 2, 13:
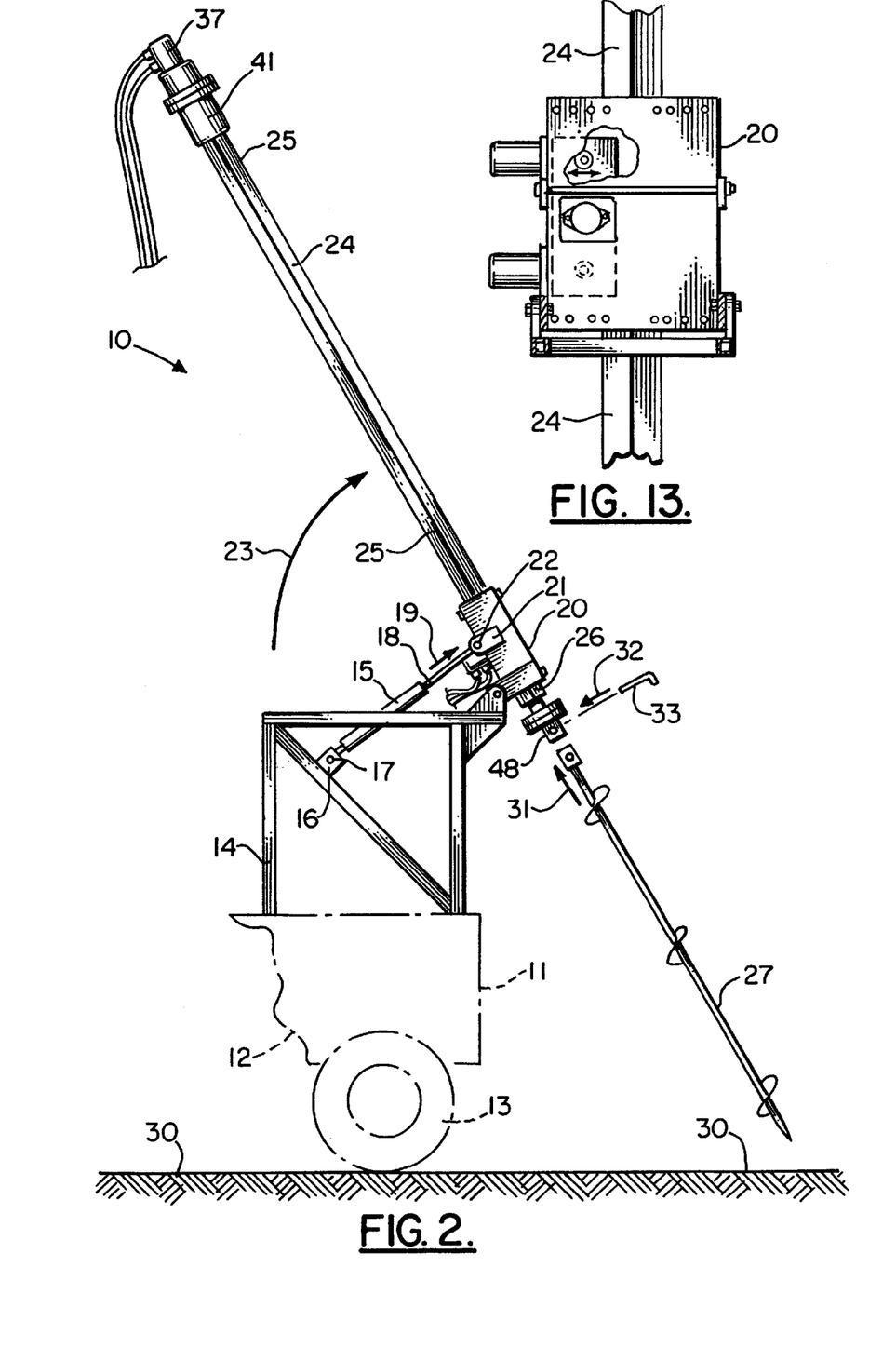
FIG. 2 is an elevational view of the preferred embodiment of the apparatus of the present invention illustrating operating position prior to the placement of an auger type anchor.
FIG. 13 is a fragmentary elevational view of the preferred embodiment of the apparatus of the present invention illustrating the drive portion thereof engaging the longitudinally extending housing.
Figures 3, 4:
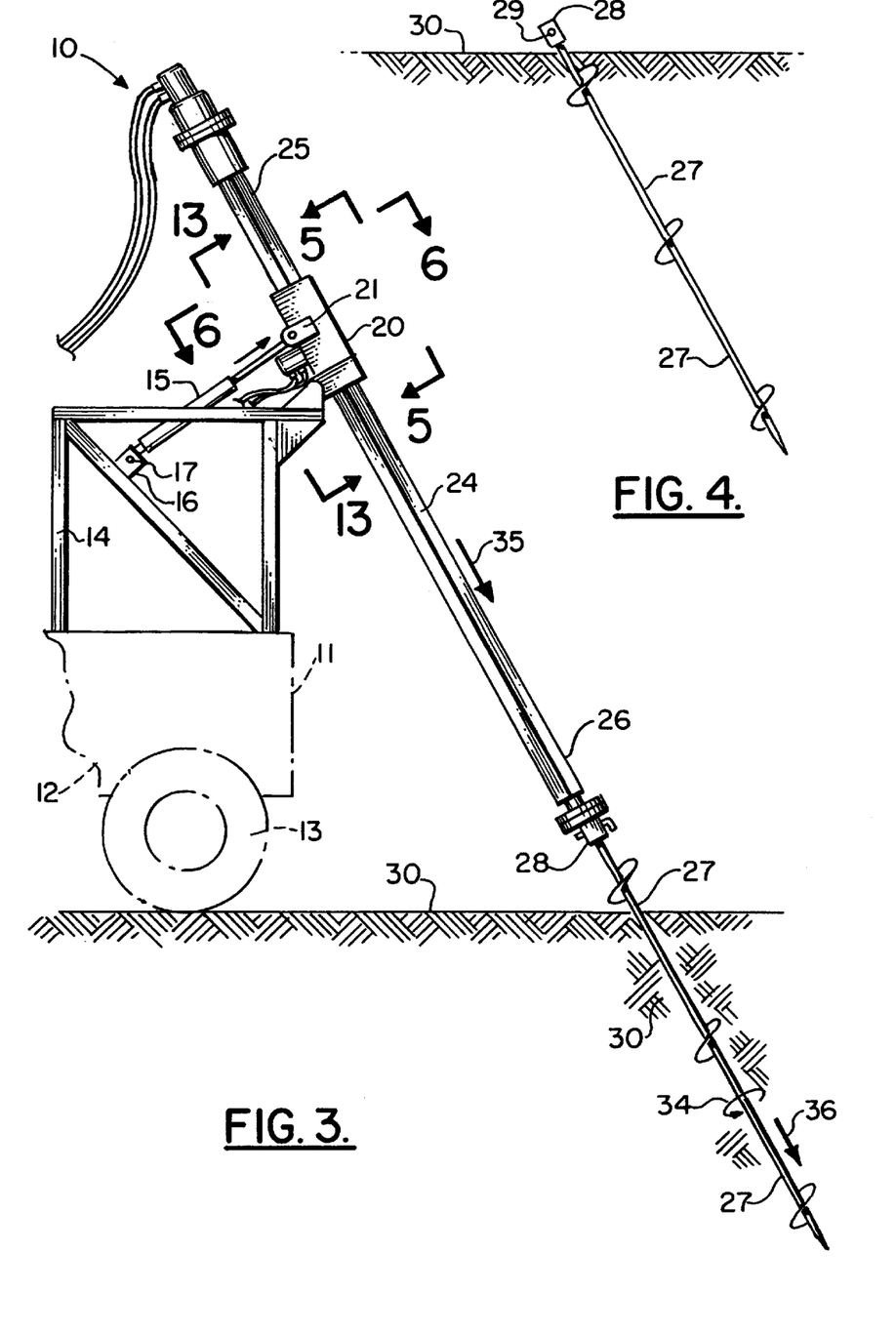
FIG. 3 is an elevational view of the preferred embodiment of the apparatus of the present invention shown during placement of an auger type anchor.
FIG. 4 is a perspective view of an auger type anchor after installation using the apparatus of the present invention.

FIGS. 1–3 show the preferred embodiment of the apparatus of the present invention designated generally by the numeral 10 in FIGS. 1–3. Anchor setting apparatus 10 can be mounted on a vehicle 11 such as a truck, marine vessel, amphibious marsh vehicle or the like. The vehicle 11 typically provides a chassis 12 such as the portion of the truck body shown in FIG. 1 has a chassis 11 and a plurality of wheels 13.

A superstructure 14 is provided on vehicle 11, being a welded structural frame for example to which the apparatus 10 of the present invention is mounted. A telescoping cylinder 15 mounts upon frame 14 for moving elongated housing 24 in between the horizontal storage position of FIG. 1 and the inclined positions of FIG. 2 and 3. Plate 16 on superstructure 14 provides trunion or pivot 17 to which telescoping hydraulically powered cylinder 15 is anchored. The end of cylinder 15 opposite pivot 17 provides a telescoping pushrod 18 that extends and retracts responsive to hydraulic, controlled fluid, as shown by arrow 19 in FIG. 2, for raising elongated housing 24 as shown by curved arrow 23 in FIG. 2. Pushrod 18 attaches to drive 20 at gusset slate 21 that pivotally connects to pushrod 18 as shown in FIGS. 1–3.

A linear drive 20 is provided for thrusting the elongated square tube housing 24 downwardly in the direction of arrow 35 as shown in FIG. 3. A rotary drive simultaneously rotates anchor 27. The linear drive 20 can be comprised of a plurality of support rollers and driven sheaves with a gear mechanism such as the one shown and described herein or the one shown and described in prior co-pending U.S. patent application Ser. No. 08/820,121, which is incorporated herein by reference.

In FIGS. 1–3, housing 24 provides and upper end portion 25 and a lower end portion 26. An auger or screw type anchor 27 is shown in FIGS. 2–4. The anchor 27 is thrust into the earth 30 using a combination of rotational force provided by rotary motor drive 37 and linear force applied by the downward movement in the direction of arrow 35 of elongated housing 24 driven by linear motor drive 20.

Figures 5, 6, 12:
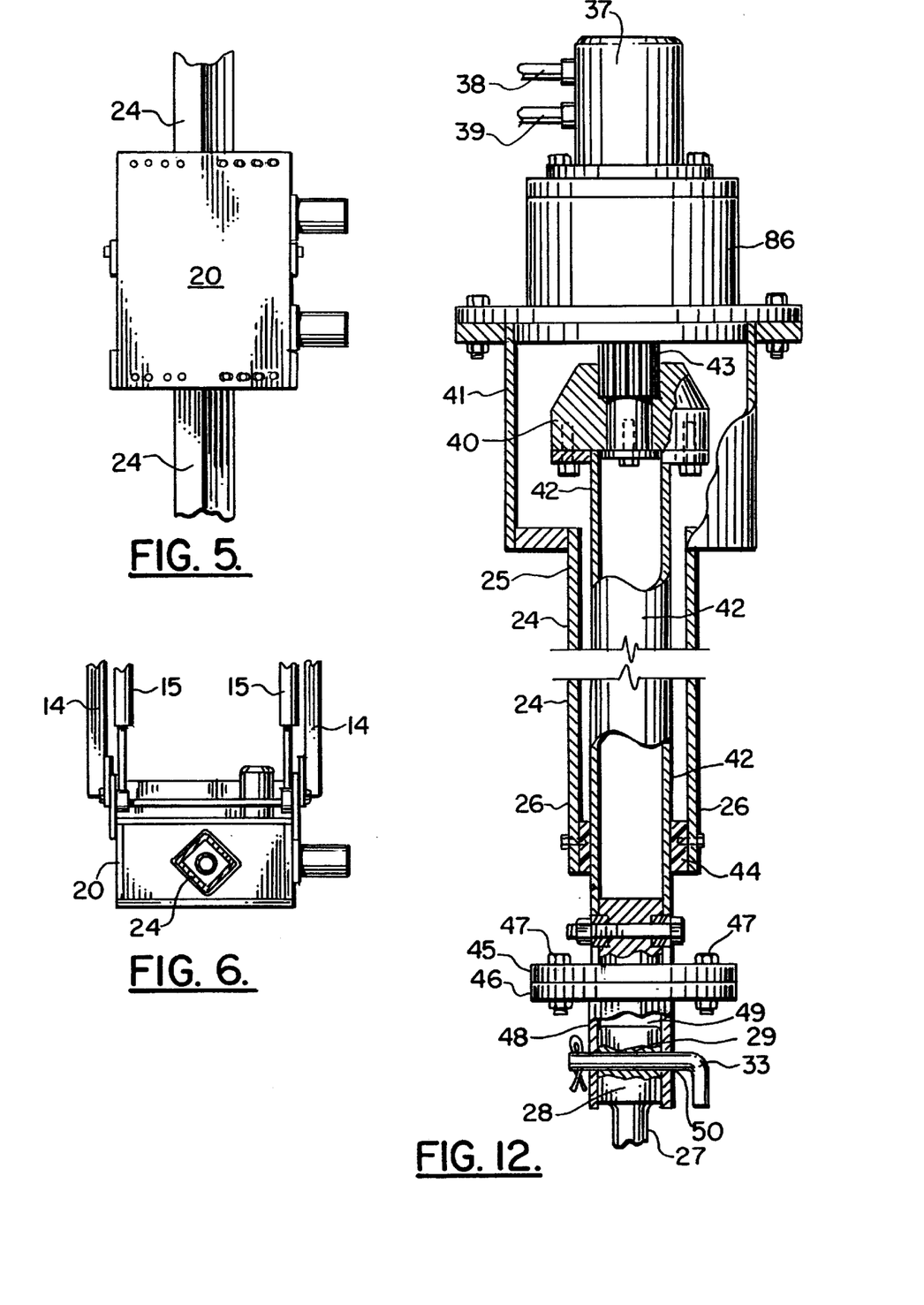
FIG. 5 is a partial elevational view of the preferred embodiment of the apparatus of the present invention illustrating the driver portion thereof.
FIG. 6 is a partial top view of the preferred embodiment of the apparatus of the present invention illustrating the driver portion thereof.
FIG. 12 is a fragmentary elevational view of the preferred embodiment of the apparatus of the present invention showing a cutaway of the housing, tubular member, and motor drive portions thereof.

Auger type anchor 27 has a square drive end 28. It is connected to elongated housing 24 at square drive block 28 (see FIG. 12). The square drive block 28 provides a transverse opening 29 through which locking pin 33 can be placed. Before such an assembly of auger type anchor 27 to elongated housing 24, the square drive block 28 portion of auger type anchor 27 must be place into a square shaped socket of square tubing 48 as shown in FIGS. 2 and 12. Once the square drive block 28 of auger type anchor 27 has been inserted into square tubing 48 as shown in FIG. 12, locking pin 33 can be placed through transverse openings 29, 49 respectively of the screw type anchor 27 and square tubing member 48 as shown in FIG. 12. A cotter pin can be used to retain locking pin 33 in its locked position. Arrow 32 in FIG. 2 illustrates the placement of locking pin 33 through the aligned openings of square drive block 28 and square tubing 48.

During insertion, linear motion is imparted to screw type anchor 27 in the direction of arrow 35, while rotary motion is imparted to screw anchor 13 as shown by arrow 34 in FIG. 3. Rotary motion is imparted to screw type anchor 27 by rotary motor drive 37 so that the combination of the linear drive and rotary drive moves the auger into the earth 30 as shown by arrow 36 in FIG. 3.

The motor drive 37 can be a hydraulic type motor, powered by hydraulic fluid that is pumped to the motor drive 37 under pressure. In FIG. 12, hydraulic flow lines 38, 39 are shown for conveying fluid to motor drive 37. The motor drive 37 drives planetary gear 86. The planetary gear output shaft 43 forms a connection with elongated tubular member 42 at upper coupling 40. The connection between planetary gear output shaft 43 and elongated tubular member 42 is protectively surrounded by an angular shroud 41. The shroud 41 forms a connection with upper end portion 25 of elongated housing 24 as shown in FIG. 12. The lower end 26 of elongated housing 24 has a sleeve bearing 44 that conforms to the outer surface of elongated tubular member 42.

A connection is formed between square tubing member 48 and elongated tubular member 42 with a pair of circular flanges 45, 46 as shown in FIG. 12. The flanges 45 and 46 can be affixed together using bolted connections 47. Square tubing member 48 can be provided with an open socket 49 sized and shaped to receive square drive block 28.

FIGS. 7–11 show the construction of linear drive member 20 more particularly. The linear drive member 20 can be the drive member that is shown and described in prior co-pending patent application Ser. No. 08/820,121, filed Mar. 19, 1997. Another and preferred drive member 20 is shown in FIGS. 7–11.

Figure 7:
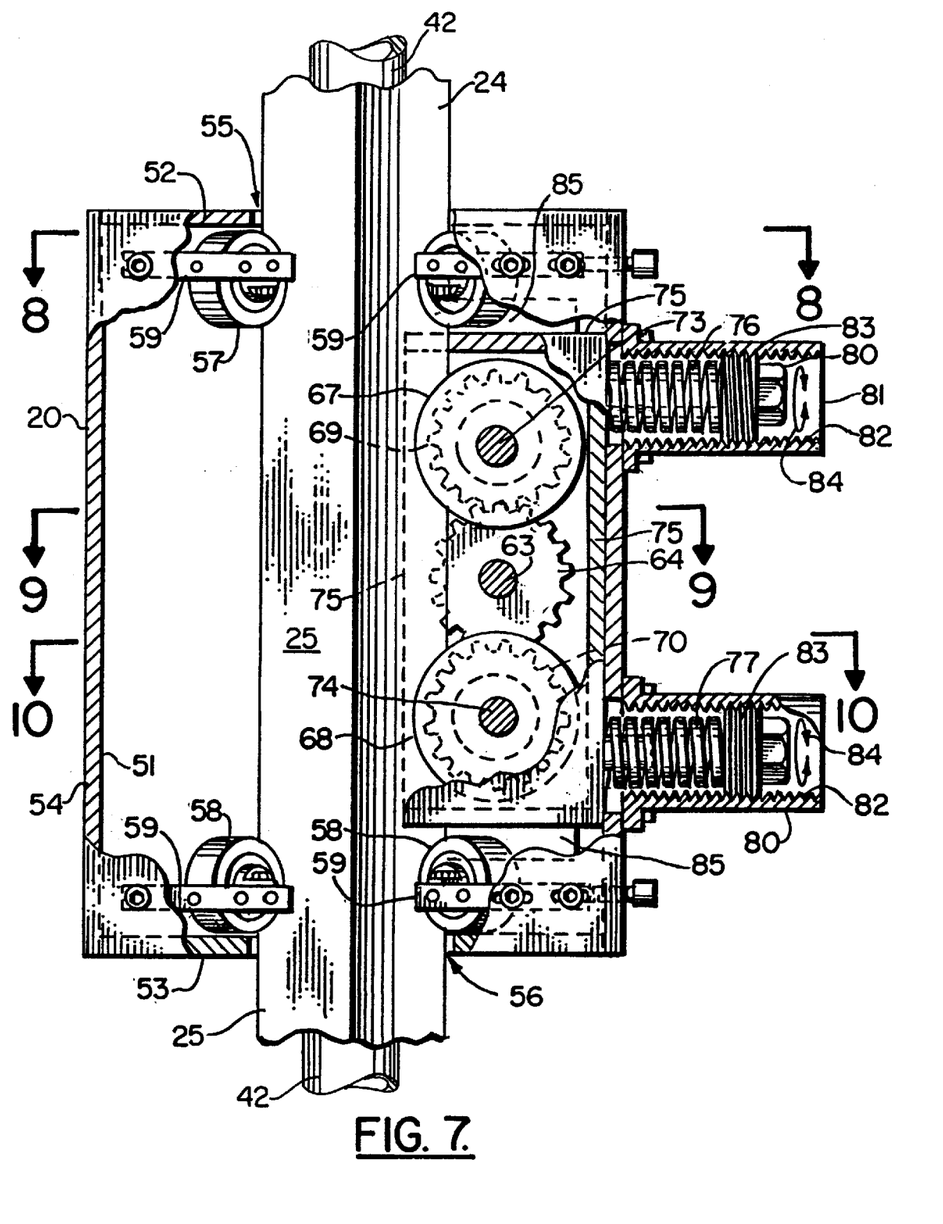
FIG. 7 is a partial view of the preferred embodiment of the apparatus of the present invention showing the drive portion thereof in sectional elevational view to illustrate engagement of the longitudinally extending housing by idler wheels and drive wheels of the drive.
Figure 8:
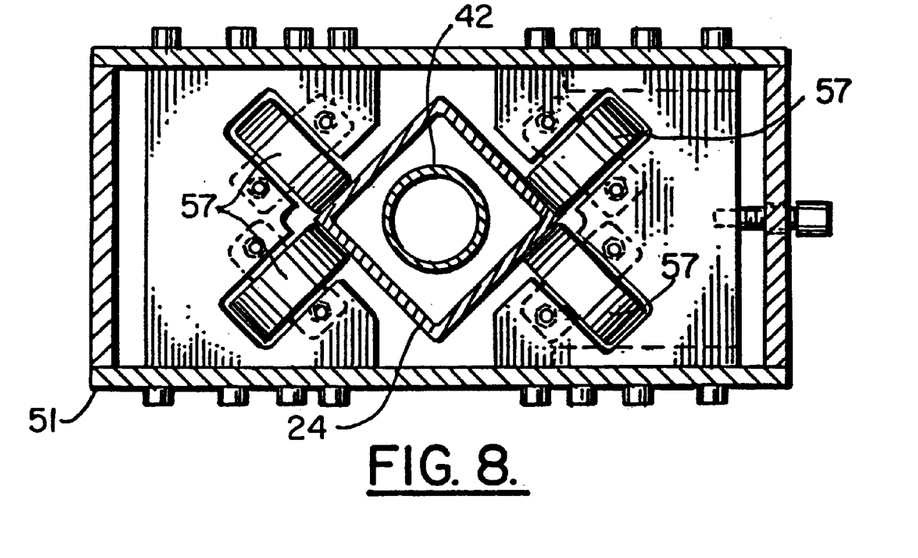
FIG. 8 is a sectional view taken along lines 8—8 of FIG. 7.

In FIGS. 7–11 linear drive motor 20 includes a frame 51 that includes an upper plate 52, lower plate 53 and side wall 54. Upper opening 55 and upper plate 52 allows elongated housing 24 to pass through frame 51 as shown in FIG. 7. Lower opening 56 in lower plate 53 likewise enables elongated housing 24 to pass through frame 51. Frame 51 provides an interior that carries a plurality of rollers. In FIGS. 7–11, upper support rollers 57 engage elongated housing 24 at opening 55. Lower support rollers 58 likewise support elongated housing 24 at opening 56. Each of the plurality of rollers 57, 58 is mounted upon a support 59 as shown in FIGS. 7–8 and 10–11. Transverse plate 65 extends across housing 51, carrying a plurality of roller supports 59. In FIGS. 7 and 8–11, upper and lower plates 65 are provided for respectively supporting upper and lower pluralities of support rollers 57, 58. Each of the roller supports 59 can be bolted to the respective plate 65 using bolts 66 for example.

Motor drive 60 can be a hydraulic motor, powered by pressurized hydraulic fluid conveyed to motor drive 60 with hydraulic flow lines 61, 62. Motor drive 60 provides drive shaft 63 and drive gear 64 that rotates with shaft 63.

Figure 9:
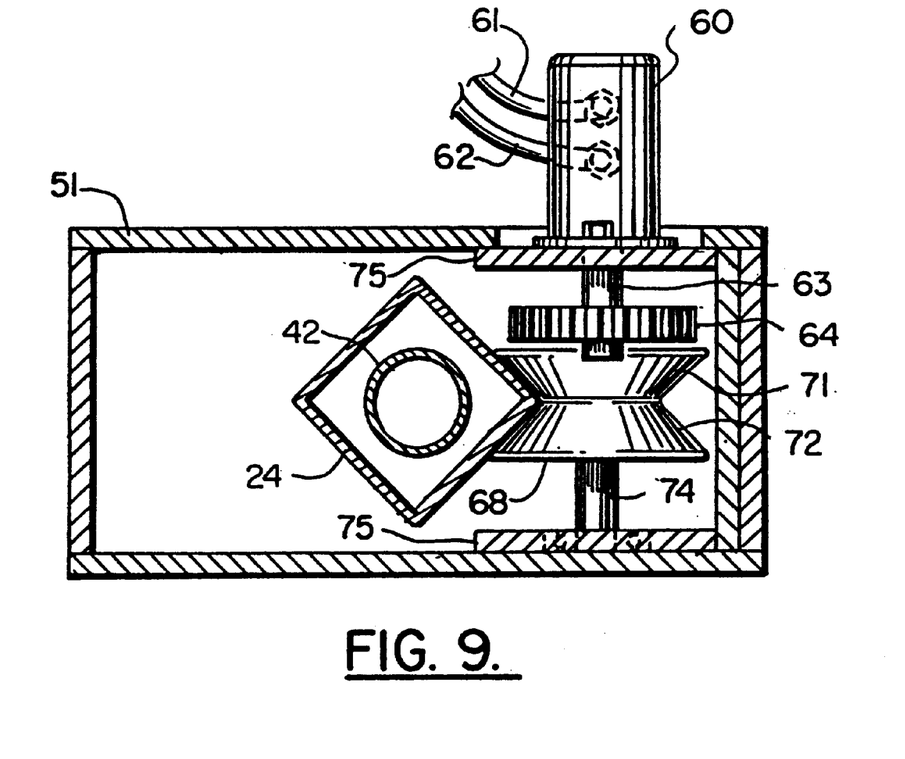
FIG. 9 is a sectional view taken along lines 9—9 of FIG. 7.
Figure 10:
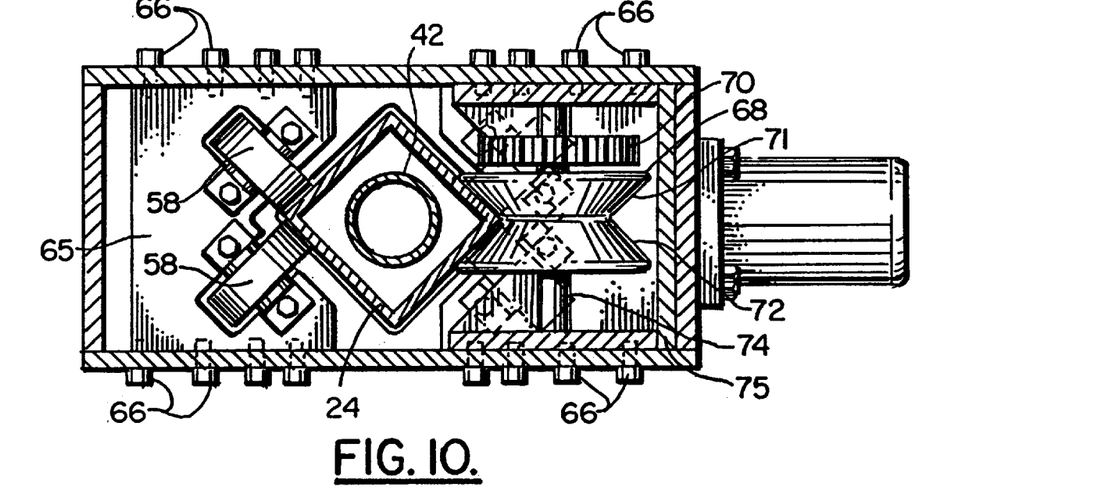
FIG. 10 is a section view taken along lines 10—10 of FIG. 7.
Figure 11:
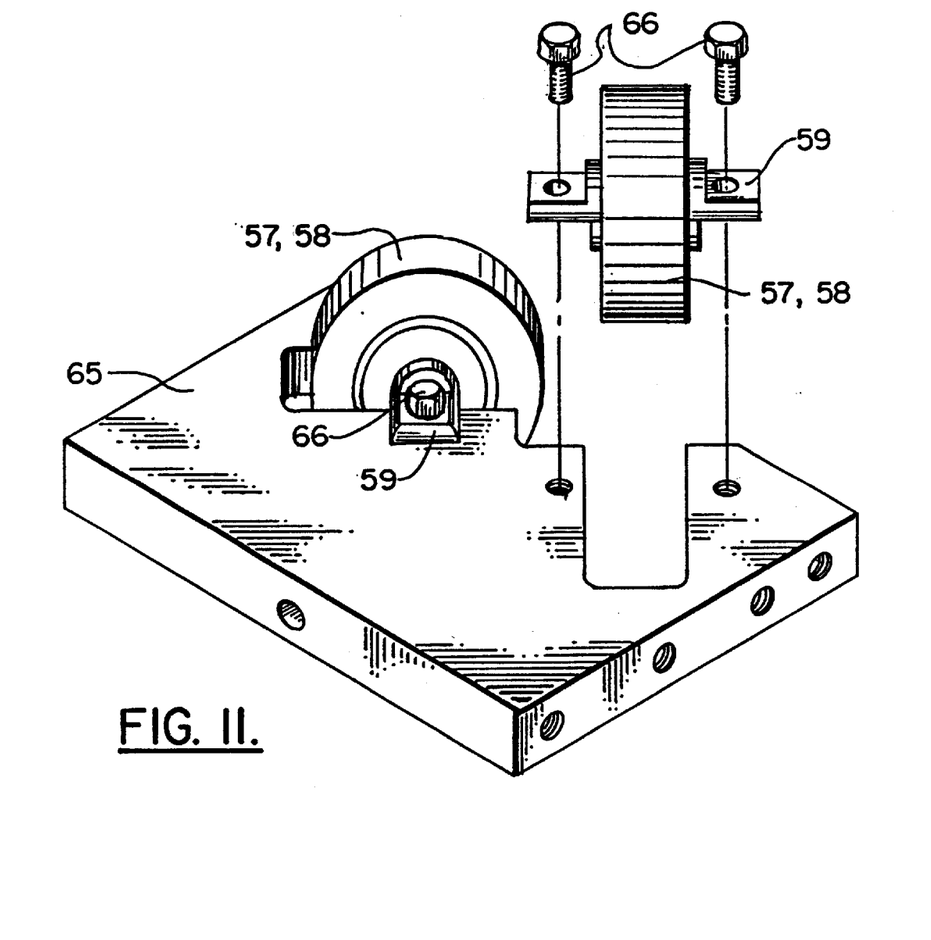
FIG. 11 is a perspective fragmentary view illustrating the idler wheel portions of the preferred embodiment of the apparatus of the present invention.

In FIG. 7, sheaves 67, 68 are positioned above and below drive gear 64. The upper sheave 67 is driven by and rotates with upper gear 69. Lower sheave 68 is driven by and rotates with lower gear 70. Each of the sheaves 67, 68 provides a pair of opposed frustoconical surfaces 71, 72 as shown in FIG. 9 for engaging elongated housing 24. The upper sheave 67 is supported by upper shaft 73. Lower sheave 68 is supported by lower shaft 74. Within the confines of frame 51, gear housing 75 can be provided for protectively covering the gears 64, 69, 70. Gear housing 75 slides within frame 20 upon guide blocks 85.

Pressure is applied to the sheaves 67, 68 with respective upper and lower springs 76, 77 that engage gear housing 75. An upper spring carrier 78 carries upper spring 76. A lower spring carrier 79 carries lower spring 77 as shown in FIG. 7. Each of the springs 76, 77 is adjustable to vary the compression applied to gear housing and then to each sheave 67 or 68 to thus increase or decrease the frictional engagement between a sheave 67 or 68 and the elongated housing 24. In FIG. 7, adjustment nuts 80 provide external threads 83 that engage the internal threads 82 of spring carriers 78, 79. Thus, each of the spring carries 78, 79 provides and internally cylindrically shaped socket 81 for carrying an adjustment nut 80. In FIG. 7, arrows 84 indicate the rotary movement of a selected nut 80 in order to adjust the springs 76, 77 during use.

The apparatus of the present invention can be used to insert auger or screw type anchors 27 into the earth 30.

This design can carry very high torque of between 1,000 and 100,000 foot pounds, typically between 1,000 and 20,000 foot pounds. During operation, the apparatus is preliminarily stored in a transportation position as shown in FIG. 1. When reaching a job site, the hydraulic cylinder 15 is actuated in order to move elongated housing 24 from the horizontal position shown in FIG. 1 (a storage position) to the inclined position of FIG. 2. Once inclined the desired number of degrees, the screw type auger 27 is connected to square tubing 48 as shown in FIGS. 2–3 and 12. The rotary drive motor 37 is then actuated in order to impart rotation to screw auger 27 that will be necessary to imbed the screw into the earth 30. Once motor drive 37 is actuated in order to give rotation to screw auger 27, motor drive 20 imparts linear motion by thrusting the elongated housing 24 downwardly in the direction of arrow 35 as shown in FIG. 3. This combination of rotary and linear motion imparted to the screw anchor causes it to threadably engage earth 30 and it is embedded a desired depth. Once the screw anchor 27 is embedded a desired depth, the user simply disconnects locking pin 33 by removing the cotter pin portion thereof and pulling the locking pin 33 from openings 29, 49. The anchor 27 is then oriented in a desired inclined position so that is can be rigged with cables or other tension members for supporting utility poles, mobile homes, cellular telephone towers, microwave towers, radio and television towers, winch anchors, fridge moorings, piling anchors, flood wall anchors, other tall structures and the like.

The following table lists the parts numbers and parts descriptions as used herein and in the drawings attached hereto.

| PARTS LIST | |
|---|---|
| Part Number | Description |
| 10 | screw anchor setting apparatus |
| 11 | vehicle |
| 12 | chassis |
| 13 | wheel |
| 14 | superstructure |
| 15 | telescoping cylinder |
| 16 | plate |
| 17 | pivot pin |
| 18 | pushrod |
| 19 | arrow |
| 20 | linear drive |
| 21 | gusset |
| 22 | pivot |
| 23 | arrow |
| 24 | elongated housing |
| 25 | upper end |
| 26 | lower end |
| 27 | auger type anchor |
| 28 | square drive block |
| 29 | transverse opening |
| 30 | earth |
| 31 | arrow |
| 32 | arrow |
| 33 | locking pin |
| 34 | curved arrow |
| 35 | arrow |
| 36 | arrow |
| 37 | rotary motor drive |
| 38 | hydraulic flow line |
| 39 | hydraulic flow line |
| 40 | upper coupling |
| 41 | shroud |
| 42 | tubular member |
| 43 | planetary gear output shaft |
| 44 | sleeve bearing |
| 45 | flange |
| 46 | flange |
| 47 | bolted connection |
| 48 | square drive tube |
| 49 | open socket |
| 50 | transverse opening |
| 51 | frame |
| 52 | upper plate |
| 53 | lower plate |
| 54 | sidewall |
| 55 | upper opening |
| 56 | lower opening |
| 57 | upper support roller |
| 58 | lower support roller |
| 59 | wheel support |
| 60 | motor drive |
| 61 | hydraulic flow line |

-continued

PARTS LIST

| Part Number | Description |
|---|---|
| 62 | hydraulic flow line |
| 63 | drive shaft |
| 64 | drive gear |
| 65 | transverse plate |
| 66 | bolt |
| 67 | upper sheave |
| 68 | lower sheave |
| 69 | upper gear |
| 70 | lower gear |
| 71 | frustoconical surface |
| 72 | frustoconical surface |
| 73 | upper shaft |
| 74 | lower shaft |
| 75 | gear housing |
| 76 | upper spring |
| 77 | lower spring |
| 78 | upper spring carrier |
| 79 | lower spring carrier |
| 80 | adjustment nut |
| 81 | cylindrical socket |
| 82 | internal thread |
| 83 | external thread |
| 84 | curved arrow |
| 85 | guide |
| 86 | planetary gear box |

Because many varying and different embodiments may be made within the scope of the active concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for placing auger type anchors beneath the surface of the earth, comprising:
   a) a machine frame;
   b) an elongated housing having a longitudinal bore, the housing supported by the frame;
   c) elongated pipe carried within the housing bore, the pipe having upper and lower ends;
   d) an anchor holder positioned at the lower end of the pipe for removably attaching to an auger type anchor to be placed;
   e) a drive mechanism that includes a plurality of wheels carried by the frame for transporting the housing between upper and lower positions, including at least some wheels that frictionally grip the housing outer surface;
   f) the drive mechanism including a gear train for interconnecting and driving some of the wheels so that multiple of the wheels rotate at the same rotational speed; and
   g) a pusher that applies lateral pressure to at least one of the wheels; and
   h) an elevating mechanism for moving the housing, the pipe, and anchor holder into an inclined position;
   i) a motor drive for rotating the pipe and an attached auger type anchor.

2. The apparatus of claim 1 wherein the drive mechanism includes a plurality of wheels that are driven wheels.

3. The apparatus of claim 1 wherein there are a plurality of opposed rollers on opposing sides of the elongated housing.

4. The apparatus of claim 3 wherein the gear train includes a drive gear, an upper gear, and a lower gear.

5. The apparatus of claim 4 wherein the gear train includes a middle gear driven by a motor drive and wherein the middle gear drives the upper and the lower gear.

6. The apparatus of claim 1 wherein some of the wheels have annular grooves that conform generally to the outer surface of the elongated housing.

7. The apparatus of claim 1 further comprising a motor drive carried at the upper end of the elongated housing for rotating the pipe.

8. The apparatus of claim 1 wherein the wheels include first and second pluralities of idler wheels positioned at spaced apart elevational positions.

9. The apparatus of claim 8 wherein the upper idler wheels are on opposite sides of the housing.

10. An apparatus for placing auger type anchors into the earth, comprising:
    a) a machine frame;
    b) an elongated housing supported by the machine frame, the housing having an upper end, a lower end, and a generally smooth uninterrupted outer surface;
    c) a tubular anchor holder contained within the housing, the anchor holder enabling an auger type anchor to be positioned at the lower end of the housing and in general alignment therewith;
    d) a drive mechanism that includes a plurality of drive wheels carried by the frame and in general alignment therewith, enabling the housing to be transported between upper and lower positions, said wheels including at least a pair of opposed wheels for frictionally gripping the generally smooth housing outer surface;
    e) each drive wheel having a smooth annular groove that is generally shaped in transverse cross section to closely conform to the housing outer surface;
    f) a gear train for interconnecting and driving a plurality of wheels so that a plurality of the wheels rotate at the same rotational speed; and
    g) a pusher that applies lateral pressure to at least one of the wheels, the pusher being adjustable so that lateral pressure applied by the wheels to the housing can be varied.

11. An apparatus for placing an auger type anchor into the earth, comprising:
    a) a machine frame;
    b) a housing carried by the frame, the housing having an upper end portion and a lower end portion;
    c) an anchor holder positioned at the lower end of the housing, the anchor holder including a disconnectable connection for connecting to an anchor that is to be placed;
    d) a chainless linear drive that enables force to be applied to the anchor holder along a line generally collinear with the auger; and
    e) a rotary motor drive for rotating the anchor holder during simultaneous linear insertion of the anchor with the linear drive.

12. An apparatus for placing an auger type anchor into the earth, comprising:
    a) a machine frame;
    b) a housing carried by the frame, the housing having an upper end portion and a lower end portion;
    c) an anchor holder positioned at the lower end of the housing, the anchor holder including a disconnectable connection for connecting to an anchor that is to be placed;

e) a linear drive for applying force to the anchor holder along a line generally collinear with the auger;

f) a rotary motor drive for rotating the anchor holder during simultaneous linear insertion of the anchor with the linear drive; and g) wherein the linear drive includes a plurality of wheels carried by the frame for transporting the housing between upper and lower positions, including at least a pair of opposed wheels for frictionally gripping the housing outer surface and a gear train for interconnecting and driving a plurality of wheels so that all of the wheels rotate at the same rotational speed.

13. The apparatus for placing an auger type anchor into the earth of claim 12 further comprising a pusher that applies lateral pressure to at least one of the wheels.

14. The apparatus of claim 13 wherein the plurality of wheels includes pairs of opposed wheels.

15. The apparatus of claim 12 wherein each of the wheels has grooves that conform generally to the outer surface of the housing.

16. The apparatus of claim 12 wherein the gear train comprises a plurality of gears.

17. The apparatus of claim 16 wherein the gears include upper and lower gears connected for rotation to an intermediate gear.

18. The apparatus of claim 16 wherein the intermediate gear is powered by a motor drive.

19. The apparatus of claim 12 wherein the anchor holder includes an elongated member supported by the housing.

20. The apparatus of claim 19 wherein the housing has a bore that contains the elongated member.

21. The apparatus of claim 20 wherein the elongated member is driven by a motor supported at the upper end of the housing.

22. An apparatus for placing an auger type anchor into the earth, comprising:

a) a vehicle;

b) a machine frame carried on the vehicle;

c) an elongated housing having an upper end portion and a lower end portion, the housing having a hollow longitudinally extending bore;

d) a tubular member rotatably mounted within the bore, the tubular member including an anchor holder positioned at the lower end portion of the housing;

e) a plurality of wheels carried by the frame for transporting the housing between upper an d lower positions, including at least a pair of opposed wheels for frictionally gripping the opposing sides of the housing;

e) a gear train for interconnecting and driving some of the wheels so that they rotate at the same rotational speed;

f) a pusher that applies lateral pressure to at least one of the wheels of the pair of opposed wheels to grip the housing; and;

g) wherein the anchor holder includes a disconnectable portion that enables an anchor to be affixed to the tubular member and disconnected therefrom once the anchor is placed.

23. A method of installing a screw type anchor comprising the steps of:

a) providing a machine that includes a chassis supporting a moving frame portion with a rotary motor drive, a linear drive that grips the outer surface of the moving frame portion during use, and an anchor holder for forming a disconnectable connection with a screw type anchor to be installed, the moving frame portion having an outer surface;

b) forming a connection between the anchor and the anchor holder;

c) moving the frame relative to the chassis so that the anchor holder supports the anchor in a selected inclined position before installation;

d) simultaneously rotating the anchor holder and thrusting it with the linear drive toward the earth so that the anchor enters the earth while rotating and while oriented in a selected inclined position;

e) frictionally engaging the outer surface of the moving frame portion with the linear drive in step "d".

24. The method of claim 23, further comprising the step of rotating the anchor between about 1 and 50 rpm.

25. The method of claim 24 further comprising the step of generating torque with the rotary drive that is more than 1,000 foot pounds.

26. The method of claim 23, further comprising the step of generating torque with the rotary drive that is between about 1 and 100,000 foot pounds.

27. The method of claim 23 further comprising the step of generating torque with the rotary drive that is between about 1 and 10,000 foot pounds.

28. The method of claim 23 further comprising the step of generating torque with the rotary drive that is more than 1,000 foot pounds.

29. A method of installing a screw type anchor comprising the steps of:

a) providing a machine that includes a chassis with a fixed frame portion supporting an elongated moving frame portion, a rotary motor drive, a linear drive, and an anchor holder for forming a disconnectable connection with a screw type anchor to be installed, b) frictionally engaging opposing sides of the moving frame portion with the linear drive;

c) forming a connection between the anchor and the anchor holder;

d) moving the frame relative to the chassis so that the anchor holder supports the anchor in a selected inclined position before installation, wherein the moving frame portion and anchor are generally aligned; and e) simultaneously rotating the anchor holder and thrusting it with the linear drive toward the earth so that the anchor enters the earth while rotating and while oriented in a selected inclined position.

* * * * *